Jan. 16, 1962  J. T. GONDEK  3,016,723
SHAFT COUPLINGS
Filed Aug. 3, 1959
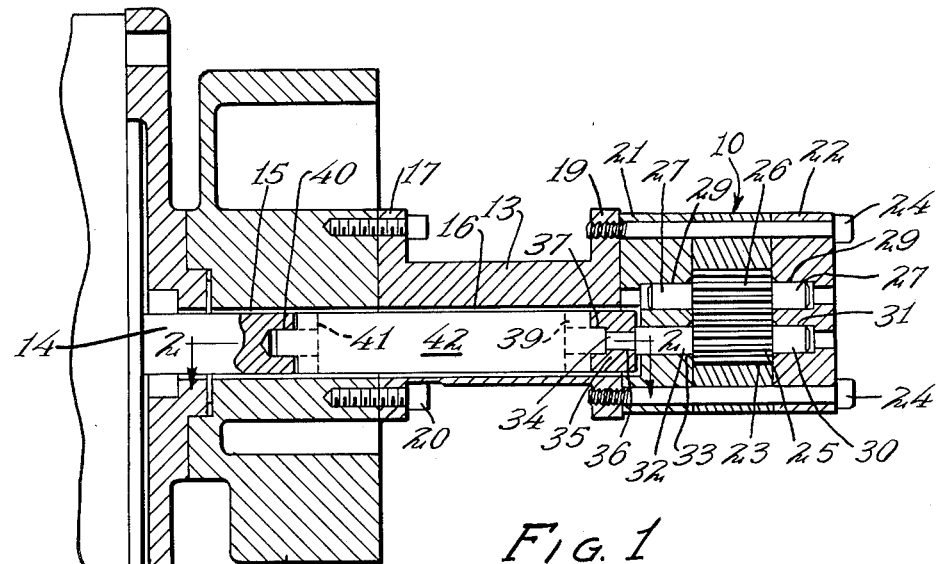
FIG. 1
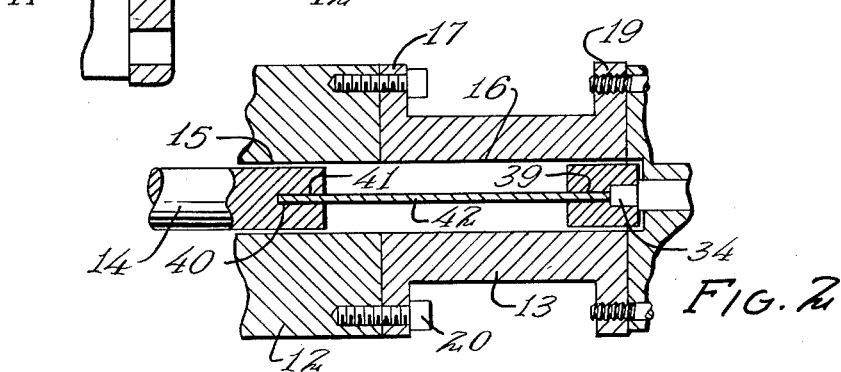
FIG. 2
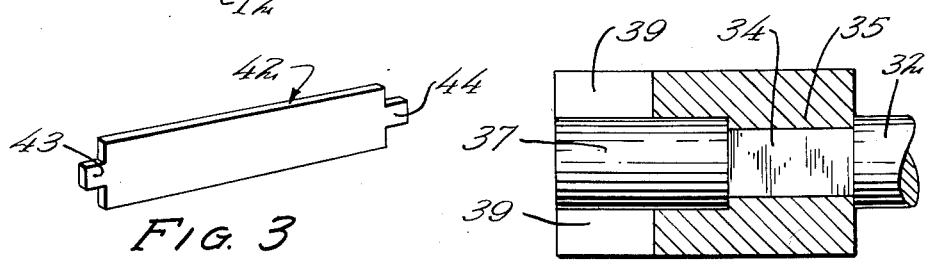
FIG. 3
FIG. 4
INVENTOR
John T. Gondek
BY Robert M. Dunning
ATTORNEY

United States Patent Office 3,016,723
Patented Jan. 16, 1962

3,016,723
SHAFT COUPLINGS
John T. Gondek, 2206 Roosevelt St. NE.,
Minneapolis, Minn.
Filed Aug. 3, 1959, Ser. No. 831,191
1 Claim. (Cl. 64—27)

This invention relates to an improvement in shaft couplings and deals particularly with a flexible connector for connecting the ends of two aligned shafts.

In my previous co-pending applications for patent Serial No. 620,320, filed November 5, 1956, now Patent No. 2,897,662, I disclosed a flexible shaft coupling comprising a generally flat elongated member having notched ends. The bases of the notches were embraced by the ends of slotted shafts, the sides of the notches overlying adjoining portions of the shaft. While this structure operates most effectively and has been successfully used in a considerable period of time, it is sometimes desirable to provide a shaft connector which is somewhat more rigid or somewhat less flexible. The present invention resides in a connector having certain of the features of the previous construction but having less flexibility, where less flexibility is desired.

A feature in the present invention resides in the provision of a shaft connector which may be a flat strip of material or which may be of other form having substantially flat ends. The ends of the connector have a central projecting tongue which is designed to extend into an axial socket in the end of each of the shafts. The portions of the connector adjoining the projection engage in a transverse slot which intercepts the axial socket. By engaging in the socket, the connector is held in axially aligned relation to the shaft. At the same time, the portions of the shaft outwardly of the socket engage the body of the connector and cause the connector to rotate with the drive shaft, and in turn to transmit power to a coaxial shaft.

A feature of the present invention resides in the fact that with the present arrangement, the shafts may be of larger diameter or the same diameter as the width of the coupling. With the previous construction, at least the ends of the coupling had to be wider than the diameter of the shafts connected so as to straddle a portion of the shaft ends.

These and other objects and novel features of the present invention will be more clearly and fully set forth in the following specification and claim.

In the drawings forming a part of the specification:

FIGURE 1 is a cross sectional view through a portion of a pump and drive shaft, showing the flexible shaft coupling connecting the drive shaft to the driven shaft.

FIGURE 2 is a sectional view taken at right angles through the sectional view of FIGURE 1, the section being indicated by the line 2—2 of FIGURE 1.

FIGURE 3 is a perspective view of the shaft coupling in its preferred form.

FIGURE 4 is an enlarged sectional view showing the manner in which the shaft coupling is connected to a multi-sided shaft.

FIGURE 1 illustrates fragmentarily an oil pump 10 driven by a motor 11 or other source of motor supply. The pump 10 is connected to one side of a fixed support 12 by means of a tubular supporting bracket 13. The motor 11 is secured in any suitable manner to the opposite side of the support 12 and includes a motor shaft 14 which extends into an axial passage 15 in the support 12. The bracket 13 includes an axial passage which forms a continuation of the passage 15. The bracket 13 is provided at opposite ends with mounting flanges 17 and 19, and bolts 20 extend through the flange 17 and into the support 12 for holding the bracket in place.

The body of the pump 10 is closed by a pair of end plates 21 and 22 which fit together to form the pump chamber 23. Bolts such as 24 extend through the casing sections 21 and 22 and into the flange 19 to hold the pump housing assembled and also to hold the pump housing in proper relation to the bracket 13.

In the arrangement illustrated, the pump comprises a gear pump including a pair of gears 25 and 26 which are in mesh. Stub shafts 27 extend axially from opposite ends of the gear 26 and are supported in suitable bearings 29 in the end plates 21 and 22. The gear 25 is provided with a first stub shaft 30 which extends from one end of the gear and is supported in the bearing 31. The stub shaft 32 at the opposite end of the gear 25 is supported in a bearing 33 which is axially aligned with the passage 40. The stub shaft 32 is provided with a multi-sided extension 34 which projects axially therefrom for a purpose which will be later described.

An adaptor 35 is provided with a multi-sided socket 36 extending axially thereinto from one end thereof, the socket 36 being designed to accommodate the multi-sided end 34 of the gear shaft 32. The purpose of the fitting 35 is merely to provide an enlarged diameter end on the gear shaft 32. If the stub shaft 32 were of the same diameter as the drive shaft 14, a fitting 35 could be eliminated and the flexible coupling could be secured in the same manner at both ends. The fitting 35 is provided with an axial socket 37 in its opposite end, the socket 37 being shown as slightly larger in diameter than the multi-sided socket 36. A slot 39 extends diametrically across the end of the fitting, intersecting the socket 37 but not extending to the base of the socket 37. The purpose of this arrangement will be later described more in detail.

The motor drive shaft 14 is provided with an axial socket 40 in its end and is provided with a slot 41 which extends across the end of the shaft, the transverse slot being only a portion of depth of the socket 40. In the arrangement illustrated, the fitting 35 and shaft 14 are of approximately the same outside diameter, the sockets 37 and 40 are of similar diameter, and the slots 39 and 41 are of approximately the same depth.

The connector or shaft coupling is best illustrated in FIGURE 3 of the drawings and may comprise a generally flat strip of spring metal which is of approximately the same width as the outside diameter of the shaft 14 and fitting 35. The end of the flexible strip 42 is provided with a pair of projecting tongues 43 and 44 which are of proper width to fit snugly into the sockets 37 and 40. The tongues 43 and 44 are centered along the axis of the strip and the strip is of proper thickness to fit snugly into the slots 39 and 41. As a result, when the coupling 43 is in place, the tongues 43 and 44 extend into the axial sockets 40 and 37 respectively on the shaft 14 and the fitting 35 and the portions of the coupling on either side of the tongues 43 and 44 and adjacent the ends of the strip of spring metal 43 are engaged in the slots 41 and 39 respectively. Thus the coupling is held in axially aligned relation to the shaft end fitting and rotation of the drive shaft 14 acts through the spring strip 42 to rotate the fitting 35.

While the center portion of the coupling has been considered flat, it is obvious that the structure could comprise flattened ends on a connector body of other cross sections. Furthermore, while one end of the connector 42 is shown engaged with a fitting 35, this coupling end could fit into the end of a driven shaft constructed identically to the end of the motor drive shaft 14.

In view of the fact that the fitting 35, in effect, comprises a short length of shaft connected to a shaft of smaller diameter, the coupling will be described in certain of the claims as connecting the ends of a pair of aligned shafts, in view of the fact that the fitting merely comprises an enlargement on the shaft end.

In accordance with the patent statutes, I have described the principles of construction and operation of my improvement in shaft couplings, and while I have endeavored to set forth the best embodiment thereof, I desire to have it understood that changes may be made within the scope of the following claim without departing from the spirit of my invention.

I claim:

A flexible coupling for connecting a pair of shafts having opposed aligned ends, the shafts having axial sockets in said opposed aligned ends and a diametrically extending slot in each of said opposed ends intersecting said socket and extending into the shaft an axial distance less than the depth of said sockets, the connector comprising a flat member of spring material having ends of a width substantially equal to the diameter of said shaft, the thickness of said flat member being substantially equal to the width of said slots, and tongues extending from the ends of the flat body and projecting therefrom into said sockets, said tongues being of a width substantially equal to the diameter of the sockets and holding said flat body from lateral movement relative to the axis of said shaft and the walls of said slots engaging said flat body on opposite sides of said tongues.

References Cited in the file of this patent

UNITED STATES PATENTS

| | | |
|---|---|---|
| 1,084,912 | Trufant | Jan. 20, 1914 |
| 2,100,232 | Barry | Nov. 23, 1937 |
| 2,221,558 | Rubenstein | Nov. 12, 1940 |
| 2,678,460 | Oishei | May 18, 1954 |
| 2,860,497 | Parks | Nov. 18, 1958 |